Patented Apr. 16, 1940

2,197,185

UNITED STATES PATENT OFFICE 2,197,185

RECOVERY OF METALS

Alan Kissock, Point Pleasant, N. J.

No Drawing. Application September 9, 1938,
Serial No. 229,091

7 Claims. (Cl. 75—119)

This invention relates to the recovery of metals from ores containing nickel, and particularly to the separation of nickel and other commercially valuable metals from iron ores containing relatively small quantities of nickel in proportion to the quantity of iron.

Nickel in ores is frequently associated with iron, copper and cobalt, and other less common elements. These ores may occur as sulphides, oxides, or in other combinations. For example, the well known Canadian ores are largely magnetic sulphide of iron containing relatively small percentages of copper, nickel and other metals, whereas, the ores of New Caledonia are made up of more or less complex oxides of iron, nickel and silicon with some of the elements of the alkaline earth group. In addition to these there are known to be great deposits of iron oxides containing small percentages of nickel, cobalt and chromium.

The separation of the commercially valuable metals from any of these nickel ores has been a relatively difficult problem involving a number of distinct metallurgical processes.

It is an object of this invention to provide a procedure whereby the separation of nickel and other commercially valuable metals from such ores may be accomplished in a more expeditious and economical manner. Other objects of the invention will become apparent.

I have found that by subjecting either oxidized ores, or roasted sulphide ores, containing iron and nickel, or containing iron, nickel and copper, with or without other metals, to certain reducing conditions, it is possible to convert the nickel compounds into a form which, when subsequently exposed to oxidizing conditions at relatively low temperatures, becomes water soluble, and may be readily separated from the water insoluble iron compounds.

The ore treated by my process may be subjected to the following sequence of steps:
1. A roast (if the ore is a sulphide);
2. A reduction in the presence of sulphur;
3. Oxidation at relatively low temperatures;
4. Separation of the water soluble constituents.

As an example of my improved procedure, an oxidized iron ore containing approximately 75% $Fe_2O_3$ and 1.5% nickel, is ground to pass, for example, through a 20-mesh screen, and is intimately mixed with from 2 to 10% of its weight of about 60 to 80 mesh iron pyrite ($FeS_2$). The mixture is heated in some suitable type of kiln, in the absence of air, to a temperature of from about 800 to 1200° F. At this temperature the sulphur of the pyrite reacts with the oxides of iron and nickel, reducing the former and converting the latter to a sulphur compound. In these reactions a part of the iron is reduced to $Fe_3O_4$ and FeO, nickel is converted to a sulphite or sulphide and a certain amount of sulphur dioxide, sulphur, hydrogen sulphide, and other similar compounds resulting from the interaction of various constituents that may be present, are liberated. Some of the reactions that may take place are as follows:

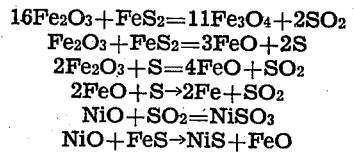

The reactions which occur are dependent upon the temperature employed, the amount of sulphur present, and other factors. For example, if more sulphur is present, the iron may be further reduced and some of it may be converted to elemental iron.

This reduction may be brought about by the use of elemental sulphur, metallic sulphides, sulphur dioxide or other sulphur compounds capable of giving up sulphur at the temperature of the reaction. Also, other reducing agents, for example, carbon, or carbon compounds, in solid or gaseous form, may be used in conjunction with the sulphur or its compounds. Obviously, with different sulphur compounds different quantities will be necessary to give equivalent amounts of sulphur. The presence of available sulphur is important in the operation of the process. If desired, the air may be initially removed by the sweeping out of the reducing furnace with an inert gas, such as nitrogen or carbon dioxide. The reduction must be carried on without admitting air or free oxygen.

After subjecting the ore to the reducing action referred to above, it should be cooled to below 100° F., and preferably to approximately room temperature, in the absence of free oxygen. If the reduced ore is exposed to air or free oxygen, even while it is warm, or if the subsequent oxidation is carried on at too high a temperature, the water solubility of the final product may be affected. An inert gas may be introduced during the cooling step to avoid the presence of free oxygen.

Having effected this reduction and sulphitization of the nickel content, the ore is subjected to an oxidation step, preferably at a temperature below the boiling point of water, in such a manner that the nickel compounds are converted to nickel sulphate or other water soluble product.

In carrying out this oxidation of the reduced ore, solutions of peroxides, persulphates, perchlorates, hypochlorites, bromine, or any other oxidizing solutions or compounds may be used. Also, the oxidation may be accomplished by the use of gaseous oxygen, by air in the presence of water or more slowly by air itself. Where the oxidation is carried out with free oxygen, the rate of oxidation should be sufficiently low to avoid overheating of the mass (by heat generated from the oxidation of the iron or lower oxides of iron) to a temperature high enough to break down the nickel sulphite and nickel sulphide and to oxidize the sulphur so liberated. For this purpose a temperature above about 300° F. should be avoided and preferably the temperature should be maintained at about room temperature or at least not over 100° F. If the oxidation is carried out in solution, a more rapid oxidation may be employed without excessive heating of the nickel compound.

As an example of a rapid oxidation in an oxidizing solution, a 1.5% solution of hydrogen peroxide in water may be used in the proportions of 20 pounds of solution to one pound of the reduced ore. In commercial operations a more dilute solution of this or some other oxidizing agent or a slower oxidation with air may be desirable.

By following such a procedure, the nickel content of the ore may be converted to a water soluble compound so that it may be separated by an aqueous leach from the other constituents of the ore, together with small percentages of other elements (such as iron, copper, manganese, aluminum, magnesium, cobalt, etc.) which may be present in the ore. For this purpose pure water or an aqueous solution of other salts may be used. The nickel may be recovered from the sulphate or other soluble nickel compound by any suitable method, such as by precipitation and smelting, or by electrolytic deposition.

In ores in which there is copper present, the copper will react similarly to the nickel and may be made water soluble by reduction in the presence of sulphur and in the absence of air (forming cuprous sulphite ($CuSO_3$) or copper sulphide) and subsequent oxidation as herein described (forming copper sulphate ($CuSO_4$)).

Although specific examples and illustrations have been given, it is obvious that the invention may be utilized in other ways, and it is not intended to restrict it to the particular embodiments or to the particular theories of operation described.

For example, if the ore is a sulphide, it may be subjected to a partial oxidizing roast whereby the ore is only partially converted to the oxide and sufficient of the sulphide is retained to provide part or all of the sulphur for the subsequent reduction and sulphitization. Also, the percentage of sulphur available during the reduction step and the temperature of the reduction may be varied depending upon the form in which it is desired to have the iron in the material from which the nickel is separated.

The oxidizing agent and the conditions of oxidation may also be varied depending upon the commercial requirements.

The invention is particularly suited to the separation of nickel from ores containing more iron than nickel and especially to ores in which the ratio of iron to nickel is high.

The terms used in describing and claiming the invention have been used in their descriptive sense and not as terms of limitation and it is intended that all equivalents of the terms used be included within the scope of the appended claims.

I claim:
1. A method of treating ores containing iron and nickel, comprising reacting the ore, at elevated temperatures under reducing conditions in the absence of free oxygen, with sufficient available sulphur to convert at least the major portion of the nickel present to nickel-sulphur compounds of lower oxygen content than the sulphate, cooling the reduced ore to below about 100° C. in the absence of air, subjecting the cooled reduced ore to oxidation to convert the nickel to a water soluble compound and subjecting the oxidized material to an aqueous leach.

2. A method of treating ores containing iron and nickel comprising reacting the ore, at elevated temperatures under reducing conditions in the absence of free oxygen, with sufficient available sulphur to convert at least the major portion of the nickel present to nickel-sulphur compounds of lower oxygen content than the sulphate, cooling the reduced ore to about room temperature in the absence of free oxygen, subjecting the cooled reduced ore to slow oxidation and leaching the oxidized material with water.

3. A method of treating ores containing iron and nickel, comprising reacting the ore, at elevated temperatures under reducing conditions in the absence of free oxygen, with sufficient available sulphur to convert at least the major portion of the nickel present to nickel-sulphur compounds of lower oxygen content than the sulphate, cooling the reduced ore to below about 100° F. in the absence of available oxygen, subjecting the cooled reduced ore to oxidation at temperatures below about 300° F. and leaching the oxidized material with an aqueous solution.

4. A method of treating ores containing iron and nickel, comprising reacting the ore, at elevated temperatures under reacting conditions in the absence of free oxygen, with sufficient available sulphur to convert at least the major portion of the nickel present to nickel-sulphur compounds of lower oxygen content than the sulphate, cooling the reduced ore to below about 100° C. in the absence of available oxygen and thereafter oxidizing it to convert the sulphite to sulphate and leaching the oxidized material with an aqueous solution.

5. A method of treating ores containing iron and nickel comprising crushing the ore and heating it, with sufficient iron pyrite to convert at least the major portion of the nickel present to nickel-sulphur compounds of lower oxygen content than the sulphate, to a temperature of about 800 to 1200° F. in the absence of free oxygen, cooling the reduced ore substantially to room temperature in the absence of available oxygen, subjecting the cooled reduced ore to oxidation at temperatures below about 100° F. and leaching the oxidized material with an aqueous solution.

6. A method of separating nickel or copper from iron ores containing nickel or copper, comprising reacting the ore, at elevated temperatures under reacting conditions in the absence of free oxygen, with sufficient available sulphur to convert at least the major portion of the nickel or copper present to nickel- or copper-sulphur compounds of lower oxygen content than the sulphate, cooling the reduced ore to room temperature in the absence of available oxygen, oxidizing the cooled, reduced ore, and leaching with water.

7. A method of treating ores containing iron and nickel, comprising reacting the ore, at elevated temperatures under reducing conditions in the absence of available oxygen, with sufficient available sulphur to convert at least the major portion of the nickel present to nickel sulphide, cooling the reduced ore to below about 100° C. in the absence of air and thereafter oxidizing it to convert the sulphide to sulphate and leaching the oxidized material with an aqueous solution.

ALAN KISSOCK.